United States Patent
Khan et al.

(10) Patent No.: US 8,311,732 B2
(45) Date of Patent: Nov. 13, 2012

(54) NAVIGATION COMMUNICATION WITH SELF-IDENTIFYING ELEMENTS

(75) Inventors: Ali Khan, Duvall, WA (US); Zhangwei Xu, Redmond, WA (US); Alexander Bussmann, Kirkland, WA (US); Dhiresh Kumar, Bothell, WA (US); Gaurav Singhal, Redmond, WA (US); Martin H. Hall, Sammamish, WA (US); Jennifer Hilary Kays, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 209 days.

(21) Appl. No.: 12/205,195

(22) Filed: Sep. 5, 2008

(65) Prior Publication Data

US 2010/0063732 A1   Mar. 11, 2010

(51) Int. Cl.
G01C 21/00 (2006.01)
G05D 1/00 (2006.01)

(52) U.S. Cl. ........... 701/408; 701/1; 701/33.2; 701/412; 701/421; 701/430

(58) Field of Classification Search ............. 701/33, 701/208, 213; 340/989, 995.12
See application file for complete search history.

(56) References Cited

U.S. PATENT DOCUMENTS

| 6,704,792 | B1 | 3/2004 | Oswald |
| 6,822,954 | B2 | 11/2004 | McConnell et al. |
| 7,010,605 | B1 | 3/2006 | Dharmarajan |
| 7,043,548 | B2 | 5/2006 | Bouet |
| 7,336,942 | B2 * | 2/2008 | Wang ................ 455/404.2 |
| 2002/0141405 | A1 | 10/2002 | Bouet |
| 2002/0150050 | A1 * | 10/2002 | Nathanson ............ 370/241 |
| 2002/0160745 | A1 * | 10/2002 | Wang ................... 455/404 |
| 2003/0074313 | A1 | 4/2003 | McConnell et al. |
| 2005/0081254 | A1 * | 4/2005 | Carlson et al. ......... 725/140 |
| 2005/0114762 | A1 | 5/2005 | Binding et al. |
| 2005/0288035 | A1 * | 12/2005 | Wang ................. 455/456.1 |
| 2007/0005808 | A1 | 1/2007 | Day |
| 2007/0244614 | A1 * | 10/2007 | Nathanson ............ 701/35 |
| 2008/0294759 | A1 * | 11/2008 | Biswas et al. .......... 709/222 |
| 2009/0100137 | A1 * | 4/2009 | Venkitaraman et al. ...... 709/205 |

OTHER PUBLICATIONS

Sensinode Ltd., "nRoute Protocol Specification", Hallituskatu Oulu, Finland, 2006, pp. 1-8.
Peter Gagnon, "The HyperText Transfer Protocol", Imperial London College, Surveys and Presentations in Information Systems Engineering(Surprise), 1997, pp. 1-5. retrived at <<http://www.doc.ic.ac.uk/~nd/surprise_97/journal/vol2/pcg1/>>.
Bayu Erfianto, "Design of a Vital Sign Protocol Format Using XML and ASN.1", M. Sc. Thesis, University of Twente, Enschede, The Netherlands, 2004.pp. 1-104.

* cited by examiner

*Primary Examiner* — Ian Jen
(74) *Attorney, Agent, or Firm* — Alleman Hall McCoy Russell & Tuttle LLP

(57) ABSTRACT

A navigation device includes a communication subsystem and a navigation subsystem. The communication subsystem communicates with a remote navigation database via a gateway using variable-size data payloads. Each variable-size data payload is accompanied by a content-identifier and a size-identifier. The navigation subsystem determines a current position of the navigation device and encodes the current position of the navigation device as one or more position payloads that are sent from the communication subsystem to the remote navigation database via the gateway. Each position payload is sent with an accompanying content-identifier and size-identifier.

20 Claims, 4 Drawing Sheets

FIG. 3

REQUEST CONTENT-IDENTIFIERS

| CONTENT-IDENTIFIER | DATA PAYLOAD |
|---|---|
| 1 | Request Local Search |
| 2 | Request Local Search Detail Info |

FIG. 4

RESPONSE CONTENT-IDENTIFIERS

| CONTENT-IDENTIFIER | DATA PAYLOAD |
|---|---|
| 5 | Response Local Search |
| 6 | Response Local Search Detail Info |

FIG. 5

LOCAL SEARCH REQUEST MESSAGE CONTENT-IDENTIFIERS

| CONTENT-IDENTIFIER | DATA PAYLOAD |
|---|---|
| 0x0A | Query Text |
| 0x0B | Category Type and ID |
| 0x0C | Search Center Coordinate |
| 0x0D | Search Radius |
| 0x0E | Maximum Number of Search Results |
| 0x0F | Search Result Fields Filtering |
| 0x10 | Search Result Type Filtering |
| 0x11 | Cultural-Info |
| 0x12 | Search Results Sort Order |

FIG. 6

LOCAL SEARCH RESPONSE CONTENT-IDENTIFIER

| CONTENT-IDENTIFIER | DATA PAYLOAD |
|---|---|
| 0x3C | Local Search Result |

FIG. 7

LOCAL SEARCH RESULT CONTENT-IDENTIFIERS

| CONTENT-IDENTIFIER | DATA PAYLOAD |
|---|---|
| 0x1D | Search Result Type |
| 0x1E | PhoneBook ID |
| 0x1F | Search Result Name |
| 0x20 | Curbside Location |
| 0x21 | Address Line |
| 0x22 | City |
| 0x23 | Province |
| 0x24 | Postal Code |
| 0x25 | Country Code |
| 0x26 | Phone Number |
| 0x27 | Categories |
| 0x28 | Rooftop Location |
| 0x29 | Email |
| 0x2A | Fax Number |
| 0x2B | Toll-Free Number |
| 0x2C | Website |
| 0x2D | Hours of Operation |
| 0x2E | Payment Options |
| 0x2F | Rating |

FIG. 8

LOCAL SEARCH DETAIL INFO REQUEST CONTENT-IDENTIFIER

| CONTENT-IDENTIFIER | DATA PAYLOAD |
|---|---|
| 0x3D | Detail Info Request |

FIG. 9

DETAIL INFO REQUEST CONTENT-IDENTIFIERS

| CONTENT-IDENTIFIER | DATA PAYLOAD |
|---|---|
| 0x1E | PhoneBook ID |
| 0x11 | Cultural-Info |

NAVIGATION COMMUNICATION WITH SELF-IDENTIFYING ELEMENTS

BACKGROUND

Personal navigation devices have become popular tools for helping people navigate to desired locations. Many personal navigation devices use a global positioning system to assess a current location of the personal navigation device. Some personal navigation devices are preloaded with maps and other information that may be useful to a person using the navigation device. However, thus far, network connectivity with other devices has been limited.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A navigation device in accordance with the present disclosure may include a communication subsystem and a navigation subsystem. The communication subsystem may be configured to communicate with a remote navigation database via a gateway using variable-size data payloads. Each variable-size data payload may be accompanied by a content-identifier and a size-identifier. The navigation subsystem may be configured to determine a current position of the navigation device and to encode the current position of the navigation device as one or more position payloads to be sent from the communication subsystem to the remote navigation database via the gateway. Each position payload may be sent with an accompanying content-identifier and size-identifier.

BRIEF DESCRIPTION OF THE DRAWINGS

FIGS. 3-9 show a nonlimiting example of a portion of a protocol that uses hexadecimal numbers as content-identifiers in accordance with an embodiment of the present disclosure.

DETAILED DESCRIPTION

Figure 1:
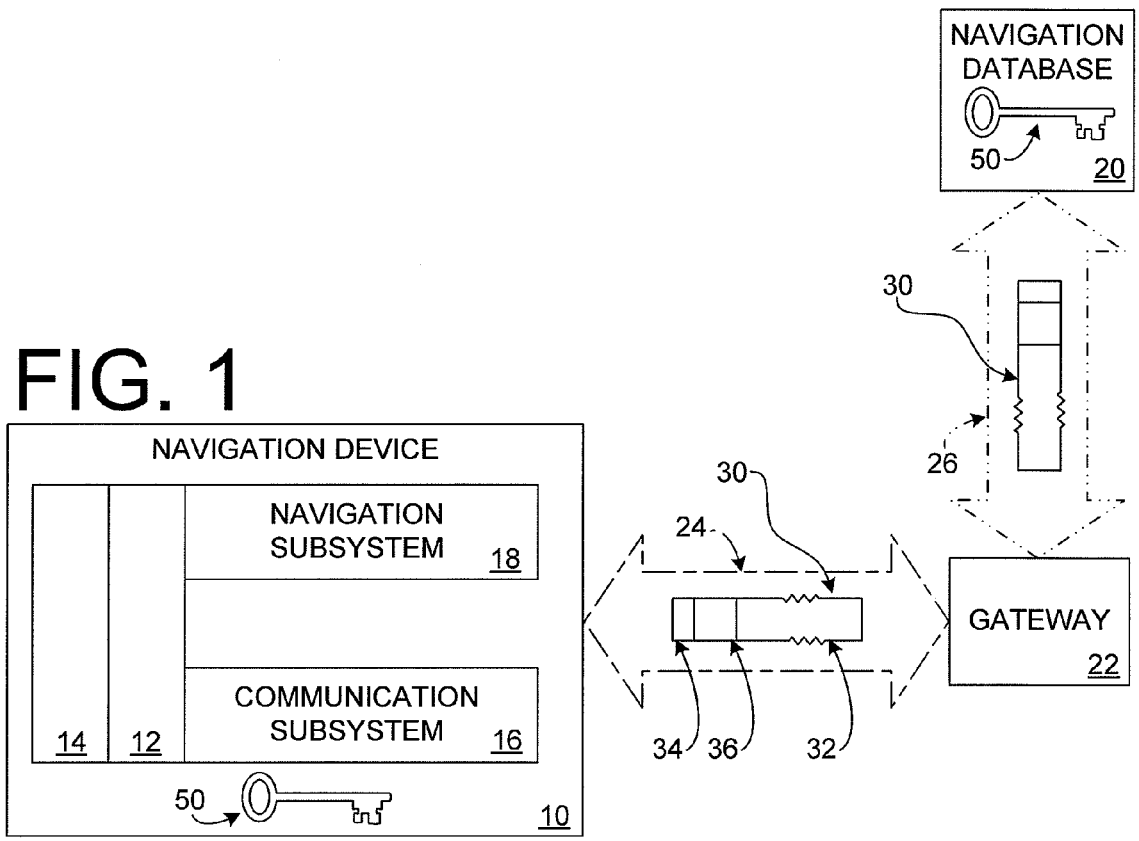
FIG. 1 schematically shows a navigation device configured to communicate with a remote navigation database via a gateway in accordance with an embodiment of the present disclosure.

FIG. 1 schematically shows a navigation device 10 that includes a logic subsystem 12, memory 14, a communication subsystem 16, and a navigation subsystem 18. Navigation device 10 may take a variety of different form factors, including, but not limited to, a hand-held navigation device, an after-market vehicle navigation device, a built-in vehicle navigation device, and a mobile computing device, among others. The present disclosure is not limited to any particular form factor or application.

Communication subsystem 16 is configured to communicate with a remote navigation database 20 (e.g., location information service) via a gateway 22. The gateway may include a cellular radio, a wireless network transceiver, and/or other components for communicating with a remotely located navigation database. As a nonlimiting example, the gateway may be a cellular telephone that is configured to utilize a cellular network to access the Internet, or another suitable network, to send and receive information to and from one or more remote navigation databases and/or other remote network nodes.

Communication subsystem 16 may be configured to communicate with the gateway using a different communication channel than the communication channel with which the gateway communicates with the remote navigation database. For example, FIG. 1 schematically shows navigation device 10 communicating with gateway 22 using a first communication channel 24, while gateway 22 communicates with remote navigation database 20 using a second communication channel 26, different than first communication channel 24.

In some embodiments, the communication subsystem may be configured to communicate with the gateway via a wired or wireless personal area network, and the gateway may be configured to communicate with the remote navigation database via a cellular network. As a nonlimiting example, the communication subsystem may include an IEEE 802.15 radio that is configured to send and receive data to and from gateway 22, and the gateway may be configured to relay such data to the remote navigation database at least in part via a cellular network. In this way, navigation device 10 may take advantage of the communication capabilities of gateway 22.

The herein disclosed navigation device and/or the gateway may be configured to communicate using one or more different communication channels, which may have different throughput capabilities. For example, the gateway may have a relatively slow cellular data connection. In order to facilitate efficient data transmission, navigation device 10 may be configured to use a relatively light communication protocol, which can be easily managed by the communication channel used between the navigation device and the gateway and the communication channel(s) used between the gateway and the remote navigation database.

The communication subsystem may be configured to send and/or receive a self-identifying element 30 to and/or from one or more remotely located navigation databases via the gateway. The self-identifying element may include a variable-size data payload 32, a content-identifier 34 specifying a content-type of the data payload, and a size-identifier 36 specifying a size of the data payload.

As a nonlimiting example, the self-identifying element may include a data payload that provides positioning information, such as a latitude and/or longitude of the navigation device. Such a data payload may be referred to as a position payload. In such a case, the content-identifier bundled with the position payload can serve as an indicator that the position payload includes positioning information. The size-identifier bundled with the position payload can indicate what size of data is used to represent the positioning information (e.g., 1 to 65,536 bytes).

Types of information other than positioning information may also be bundled as a self-identifying element which can be sent to and from the navigation device. As nonlimiting examples, a phonebook ID, phone number, email address, or query text can be carried as the data payload of a self-identifying element.

As explained in more detail below, the content-identifier bundled with a data payload can signal the type of information carried by the data payload. Furthermore, the size-identifier can signal the length of the variable-size data payload. In this way, various different types of information can be efficiently sent to and from the navigation device in a manner that allows the receiving device to easily identify the contents of the data payload and the length of the variable-size data payload. Because the self-identifying element self-specifies the length of its data payload, superfluous, unused, and/or empty data need not be transmitted to ensure a downstream device receives a payload having a fixed length.

Figure 2:
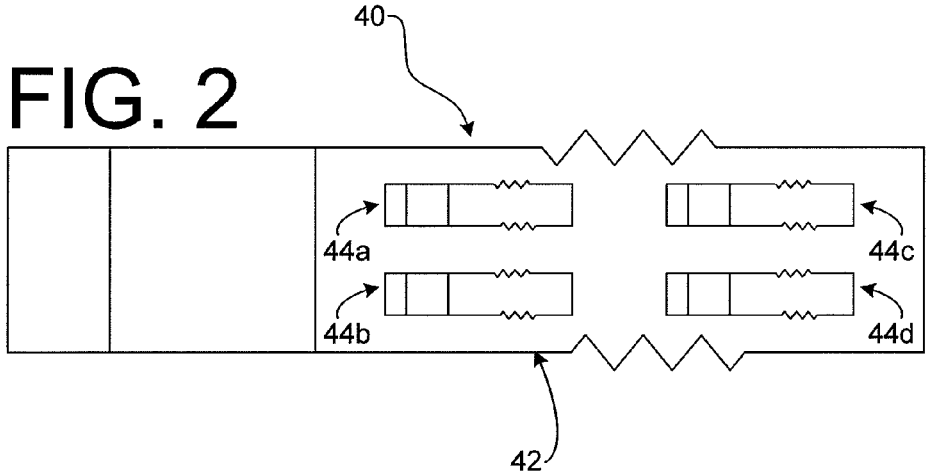
FIG. 2 schematically shows a self-identifying element including a variable-size data payload, a content-identifier specifying a content-type of the data payload, and a size-identifier specifying a size of the data payload.

As shown in FIG. 2, in some embodiments, a self-identifying element 40 may include a data payload 42 that includes one or more other self-identifying elements (e.g., 44a, 44b, 44c, and 44d). In other words, sending a self-identifying element may include sending the self-identifying element as a payload portion of another self-identifying element. Furthermore, a self-identifying element carried as the data payload in a parent self-identifying element may itself carry one or more child self-identifying elements as its data payload.

Communication subsystem 16 may be configured to send and receive each variable-size data payload with an accompanying content-identifier that is selected from a finite set of predetermined content-identifiers. In other words, a protocol can be preselected so that different types of information correspond to different content-identifiers. In FIG. 1, a key 50 is used to schematically show that navigation device 10 and navigation database 20 have agreed to using the same set of predetermined content-identifiers.

Whenever a receiver (e.g., navigation device 10 or navigation database 20) receives a self-identifying element with a known content-identifier, the receiver can extract the data payload based on the length value specified by the accompanying size-identifier.

FIGS. 3-9 show a nonlimiting example of a portion of a protocol, which uses hexadecimal numbers as content-identifiers for various types of data payloads that may enhance the functionality of a navigation device.

In the example embodiment provided in FIGS. 3-9, a position payload is signaled by a hexadecimal content-identifier having a value of 0x0C. As used herein, "0x" is the prefix used to signal a hexadecimal number. Of course, other protocols within the scope of this disclosure may use other content-identifiers to signal various types of payload contents.

When designing a protocol in accordance with the present disclosure, the length of the content-identifier may be selected to accommodate the number of different types of data payloads to be handled by the protocol. For example, a 1 byte content-identifier will accommodate 256 different types of data payloads, whereas a 2 byte content-identifier will accommodate 65,536 different types of data payloads. In the illustrated embodiment, the content-identifier accompanying each data payload is encoded as a 1 byte hexadecimal number. It should be understood that the size of the content-identifier can be increased to any desired size in order to accommodate greater variety in the types of data payloads supported by the protocol. Further, all data may be binary encoded, text encoded, or encoded in virtually any other suitable manner.

Similarly, the length of the size-identifier can be selected to accommodate a desired upper-limit on the amount of data to be encoded as the data payload. As a nonlimiting example, the size-identifier accompanying each data payload can be encoded as a 2 byte hexadecimal number. A 2 byte hexadecimal size-identifier will support payload lengths up to 65,536 bytes. If longer payloads are desired for a particular protocol, the length of the size-identifier can be increased accordingly.

In some embodiments, communication subsystem 16 may be configured to send a self-identifying element as a portion of a body of an HTTP POST. The body of the HTTP post may be encoded using UTF-8 encoding. Multi-integer values may be sent and received in network byte order (i.e., Big-Endian). In other embodiments, a self-identifying element may be sent in another suitable manner. As a nonlimiting example, a self-identifying element may be sent using a TCP protocol.

A self-identifying element may be sent with information in addition to the content-identifier, size-identifier, and variable-size data payload. As a nonlimiting example, an error-detection checksum can be sent with the self-identifying element for inspection by the remote navigation database. For example, each self-identifying element may be sent with a 2 byte CRC 16 (cyclic redundancy checksum) of an HTTP body, which includes the self-identifying element. Such a CRC 16 checksum may be sent as part of an HTTP header, or as part of transport meta-data of another suitable type. In some embodiments, a checksum may be specified as a 4-character UTF-8 hex string which is encoded in network byte order (i.e., Big-Endian). On the receiving end, the checksum of the HTTP body can be computed and compared with the value sent in the HTTP header. If the computed checksum matches the value in the header, the request may be accepted. If the computed checksum does not match the value in the header, the request may be declined.

Turning back to FIG. 1, navigation subsystem 18 may be configured to determine a current position of navigation device 10. As a nonlimiting example, the navigation device may include a global positioning system (GPS) receiver, which may calculate the current position of the navigation device using trilateration of three or more satellites. Once a current position is determined, the current position may be encoded as one or more position payloads to be sent from the communication subsystem to the remote navigation database via the gateway. As discussed above, each position payload may be sent with an accompanying content-identifier and size-identifier.

A GPS receiver is provided as a nonlimiting example mechanism for determining a current position. In other embodiments, another global satellite positioning device or global satellite positioning system may be used. In some embodiments, a current location may be determined using network geolocation, GSM localization, or other suitable techniques.

In some embodiments, a position payload may be sent to a navigation database with accompanying information. For example, a self-identifying element including a position payload (e.g., self-identifying element 44a of FIG. 2) may be sent with other self-identifying elements (e.g., self-identifying element 44b, self-identifying element 44c, and self-identifying element 44d).

As a nonlimiting example, a position payload may be sent to the navigation database with parameters including category type and ID (signaled by content-identifier 0x0B in FIG. 5), search radius (signaled by content-identifier 0x0D in FIG. 5), upper limit of search results (signaled as 0x0E in FIG. 5), and/or other parameters. The position payload, category type and ID, search radius, upper limit of search results and/or other parameters may be bundled in a "request local search" payload (signaled by content-identifier 1 in FIG. 3). Such a request may ask the navigation database to return a listing of, for example, at most 10 barbeque restaurants within a 5 mile radius of a current position (as determined by the navigation subsystem).

In response to such a request, the navigation database may send to the navigation device a plurality of self-identifying elements including information relevant to the request. For example, for each barbeque restaurant within 5 miles of the current position of the navigation device, the navigation database may return a phonebook ID (signaled by content-identifier 0x1E of FIG. 7), address (signaled by content-identifier 0x21 of FIG. 7), phone number (signaled by content-identifier 0x26 of FIG. 7), hours of operation (signaled by content-identifier 0x2D of FIG. 7), payment options (signaled by content-identifier 0x2E of FIG. 7), and/or other information. Such returned information may be bundled in a local search response self-identifying element (signaled by content-identifier 0x3C of FIG. 6).

The above example is not limiting. Other information may be sent from the navigation device to the navigation database, and/or other information may be returned from the navigation database to the navigation device. A protocol may be created to allow the sending and receiving of virtually any type of information in accordance with the present disclosure.

Gateway 22 of FIG. 1 may be a device external to navigation device 10, as illustrated. It should be understood that a gateway may alternatively be integrated with a navigation device without departing from the scope of this disclosure. For example, a navigation device may include a cellular radio configured to relay self-identifying elements from the communication subsystem to the navigation database, and vice versa.

Returning to FIG. 1, logic subsystem 12 may include one or more physical devices configured to execute one or more instructions. For example, the logic subsystem may be configured to execute one or more instructions that are part of one or more programs, routines, objects, components, data structures, or other logical constructs. Such instructions may be implemented to perform a task, implement a data type, change the state of one or more devices, or otherwise arrive at a desired result. The logic subsystem may include one or more processors that are configured to execute software instructions. Additionally or alternatively, the logic subsystem may include one or more hardware or firmware logic machines configured to execute hardware or firmware instructions. The logic subsystem may optionally include individual components that are distributed throughout two or more devices, which may be remotely located in some embodiments.

Memory 14 may include one or more physical devices configured to hold instructions that, when executed by the logic subsystem, cause the logic subsystem to implement the herein described procedures, methods, and processes. Memory 14 may include removable media, and/or memory 14 may be built in to one or more other devices. Memory 14 may include optical memory devices, semiconductor memory devices, and/or magnetic memory devices, among others. Memory 14 may include portions with one or more of the following characteristics: volatile, nonvolatile, dynamic, static, read/write, read-only, random access, sequential access, location addressable, file addressable, and content addressable. In some embodiments, logic subsystem 12 and memory 14 may be integrated into one or more common devices and/or computing systems.

In some embodiments, portions of logic subsystem 12 and/or memory 14 may comprise portions of communication subsystem 16 and/or navigation subsystem 18. In some embodiments, the navigation subsystem and the communication subsystem may share components, including, but not limited to, portions of logic subsystem 12 and/or memory 14.

Figure 10:
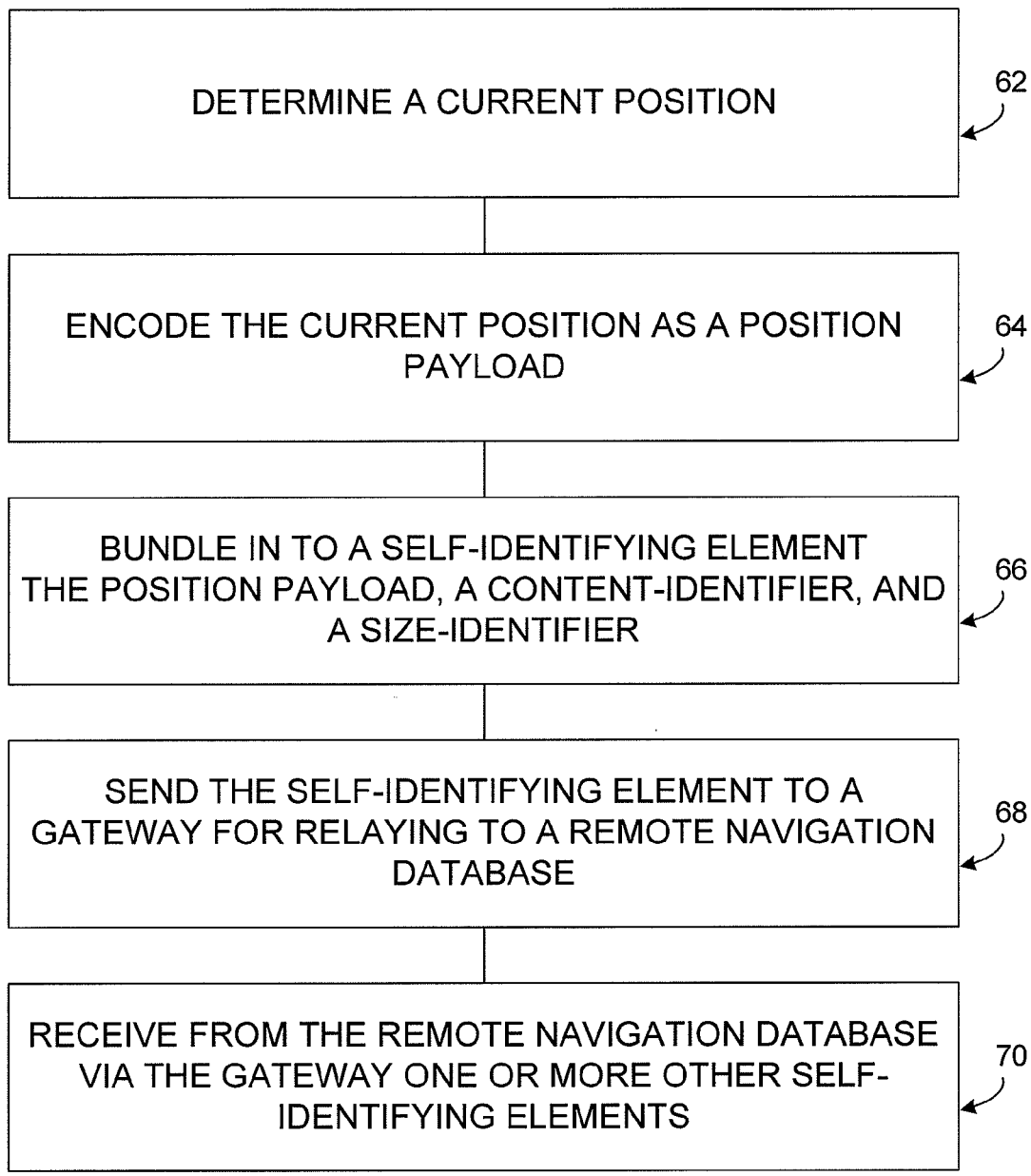
FIG. 10 shows a process flow of a method of exchanging personal navigation information in accordance with an embodiment of the present disclosure.

FIG. 10 shows a process flow of an example method 60 of exchanging personal navigation information. At 62, method 60 includes determining a current position. At 64, method 60 includes encoding the current position as a position payload. At 66, method 60 includes bundling the position payload with a content-identifier specifying a content-type of the position payload and a size-identifier specifying a size of the position payload. As described above, the position payload, content-identifier, and size-identifier collectively constitute a self-identifying element. At 68, method 60 includes sending the self-identifying element including the position payload to a gateway for relaying to a remote navigation database. At 70, method 60 includes receiving from the remote navigation database via the gateway one or more other self-identifying elements. As described above, each self-identifying element received by the navigation device may include a data payload, a content-identifier specifying a content-type of that received data payload, and a size-identifier specifying a size of that received data payload. The self-identifying elements received by the navigation device from the remote navigation database may answer a search request from the navigation device by providing, for example, information regarding nearby locations pertinent to the search request.

It should be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A navigation device, comprising: a logic subsystem including one or more physical devices and configured to execute instructions;
   a communication subsystem to communicate with a remote navigation database via a gateway, the communication subsystem configured to use parent self-identifying elements including a parent variable-size data payload, a parent size-identifier, and a parent content-identifier, the parent content-identifier identifying the parent variable-size data payload as including a plurality of nested child self-identifying elements, each nested child self-identifying element including a child variable-size data payload, a child size-identifier, and a child content-identifier, the parent size-identifier specifying a combined size of the plurality of nested child self-identifying elements; and
   a navigation subsystem to determine a current position of the navigation device and to encode the current position of the navigation device as one or more child position payloads to be sent from the communication subsystem to the remote navigation database via the gateway, each child position payload to be sent as one of the plurality of nested child self-identifying elements included as part of the parent variable-size data payload.

2. The navigation device of claim 1, where the communication subsystem is configured to send and receive variable-size data payloads via a first communication channel, different than a second communication channel that the gateway uses to send and receive the variable-size data payloads to and from the remote navigation database.

3. The navigation device of claim 2, where the communication subsystem is configured to send and receive variable-size data payloads to the gateway via a personal area network, and where the gateway is configured to send and receive variable-size data payloads to and from the remote navigation database via a cellular network.

4. The navigation device of claim 3, where the communication subsystem includes an IEEE 802.15 radio configured to send and receive variable-size data payloads with accompanying content-identifiers and size-identifiers.

5. The navigation device of claim 1, where the communication subsystem is further configured to send an error-detection checksum for inspection by the remote navigation database.

6. The navigation device of claim 5, where the error-detection checksum is a cyclic redundancy check sent in an HTTP header.

7. The navigation device of claim 1, where the communication subsystem is configured to send each child position payload and accompanying child content-identifier and child size-identifier as a portion of a body of an HTTP POST.

8. The navigation device of claim 1, where the content-identifier accompanying each data payload is encoded as a 1 byte number and the size-identifier accompanying each data payload is encoded as a 2 byte number.

9. A method for exchanging personal navigation information, comprising: with a navigation subsystem of a navigation device determining a current position; with a logic subsystem of the navigation device, encoding the current position as a position payload; with the logic subsystem of the navigation device, bundling the position payload,
  with a content-identifier specifying a content-type of the position payload and a size-identifier specifying a size of the position payload, the position payload and bundled content-identifier and size-identifier collectively constituting a nested self-identifying element, the content-identifier belonging to a finite set of predetermined content-identifiers including at least one content-identifier that identifies a parent self-identifying element as including a plurality of nested child self-identifying elements;
  with a communication subsystem of the navigation device, sending the nested self-identifying element . . . with the communication subsystem of the navigation device, receiving from the remote navigation database via the gateway
  one or more other self-identifying elements, each received self-identifying element including a data payload, a content-identifier specifying a content-type of that received data payload and a size-identifier specifying a size of that received data payload.

10. The method of claim 9, where sending the self-identifying element to a gateway includes sending the self-identifying element via a first communication channel, different than a second communication channel that the gateway uses to send the self-identifying element to the remote navigation database.

11. The method of claim 10, where sending the self-identifying element via a first communication channel includes sending the self-identifying element via an IEEE 802.15 communication channel.

12. The method of claim 9, where sending the self-identifying element includes sending the self-identifying element as a portion of a body of an HTTP POST.

13. The method of claim 9, where sending the self-identifying element includes sending the self-identifying element as a payload portion of another self-identifying element.

14. The method of claim 9, where the content-identifier of each self-identifying element is encoded as a 1 byte number and the size-identifier of each self-identifying element is encoded as a 2 byte number.

15. The method of claim 9, further comprising sending an error-detection checksum for inspection by the remote navigation database.

16. Memory holding executable instructions that, when executed by a logic subsystem, cause the logic subsystem to:
  determine a current position;
  encode the current position as a position payload;
  bundle the position payload with a child content-identifier specifying a content-type of the position payload and a child size-identifier specifying a size of the position payload, the position payload and bundled child content-identifier and child size-identifier collectively constituting a child self-identifying element;
  packaging the child self-identifying element with one or more other child self-identifying elements to form a parent payload;
  bundling the parent payload with a parent content-identifier identifying the parent payload as including a plurality of nested child self-identifying elements, and a parent size-identifier specifying a combined size of the plurality of nested child self-identifying elements;
  send the parent self-identifying element including the child self-identifying element including the position payload to a gateway for relaying to a remote navigation database; and
  receive from the remote navigation database via the gateway one or more other self-identifying elements, each received self-identifying element including a payload, a content-identifier specifying a content-type of that received payload and a size-identifier specifying a size of that received payload.

17. The navigation device of claim 1, where the parent variable-size data payload includes at least one child variable-size data payload related to the current position, the at least one child variable-size data payload being accompanied by a child content-identifier that defines a parameter of a search query of the remote navigation database specific to the current position.

18. The method of claim 9, where the nested self-identifying element including the position payload is a child self-identifying element of a parent self-identifying element, the parent self-identifying element including a child self-identifying element that includes a payload and a content-identifier that defines that payload as a parameter of a search query of the remote navigation database specific to the current position.

19. The navigation device of claim 1, where the parent content-identifier and each child content-identifier belong to a same finite set of predetermined content-identifiers including at least one content-identifier that identifies a parent self-identifying element as including a plurality of nested child self-identifying elements, and where the parent content-identifier and each child content-identifier have a same data format.

20. The navigation device of claim 19, where the same data format is a hexadecimal number format.

* * * * *